United States Patent [19]

Adsett

[11] Patent Number: 4,713,825
[45] Date of Patent: Dec. 15, 1987

[54] GAS LASER AND METHOD OF MAKING A GAS LASER

[75] Inventor: Anthony P. Adsett, Orlando, Fla.
[73] Assignee: Litton Systems, Inc., Orlando, Fla.
[21] Appl. No.: 881,097
[22] Filed: Jul. 2, 1986
[51] Int. Cl.$^4$ ............................................... H01S 3/08
[52] U.S. Cl. ..................................... 372/107; 372/34; 372/55; 372/64
[58] Field of Search ..................... 372/107, 64, 65, 34, 372/55, 103

[56] References Cited

U.S. PATENT DOCUMENTS

| | | | |
|---|---|---|---|
| 3,904,986 | 9/1975 | Hernqvist | 372/107 |
| 4,063,803 | 12/1977 | Wright | 372/103 |
| 4,464,763 | 8/1984 | Mohler | 372/107 |
| 4,575,853 | 3/1986 | Jako | 372/61 |
| 4,613,972 | 9/1983 | Bettman | 372/107 |
| 4,618,960 | 10/1986 | Nazemi | 372/61 |

Primary Examiner—Leon Scott, Jr.
Attorney, Agent, or Firm—William M. Hobby, III

[57] ABSTRACT

A gas laser apparatus includes a ceramic wave guide having a bore extending therethrough and a pair of slots formed in the exterior thereof with electrodes formed in the slots. An optical assembly is mounted on each end of the Waveguide and includes a mirror which is attached to a metal ring in the optical assembly where they harden a fused glass frit material. A plurality of invar metal rods connects the optical assemblies and has adjustment screws on each end of each rod for tilting a portion of the optical assembly on a metal flexure member to align the mirrors. The tubes and rods in the optical assemblies holding each mirror have temperature compensating materials and sizes to maintain the mirror in alignment, and separation over wide ambient and operating temperatures.

A process of making a gas laser includes the steps of selecting an optical mirror blank, making a metal mirror blank support ring having an opening therethrough for mounting the selected mirror blank therein, applying a glass paste material between the mirror blank and the mirror support ring, heating the mirror blank and the mirror blank support ring and glass paste material to a temperature in excess of 400 degrees centigrade to seal the mirror blank to the metal mirror blank support ring with a glass frit seal, and then attaching the support ring to a laser optical assembly on each end of a laser assembly.

14 Claims, 6 Drawing Figures

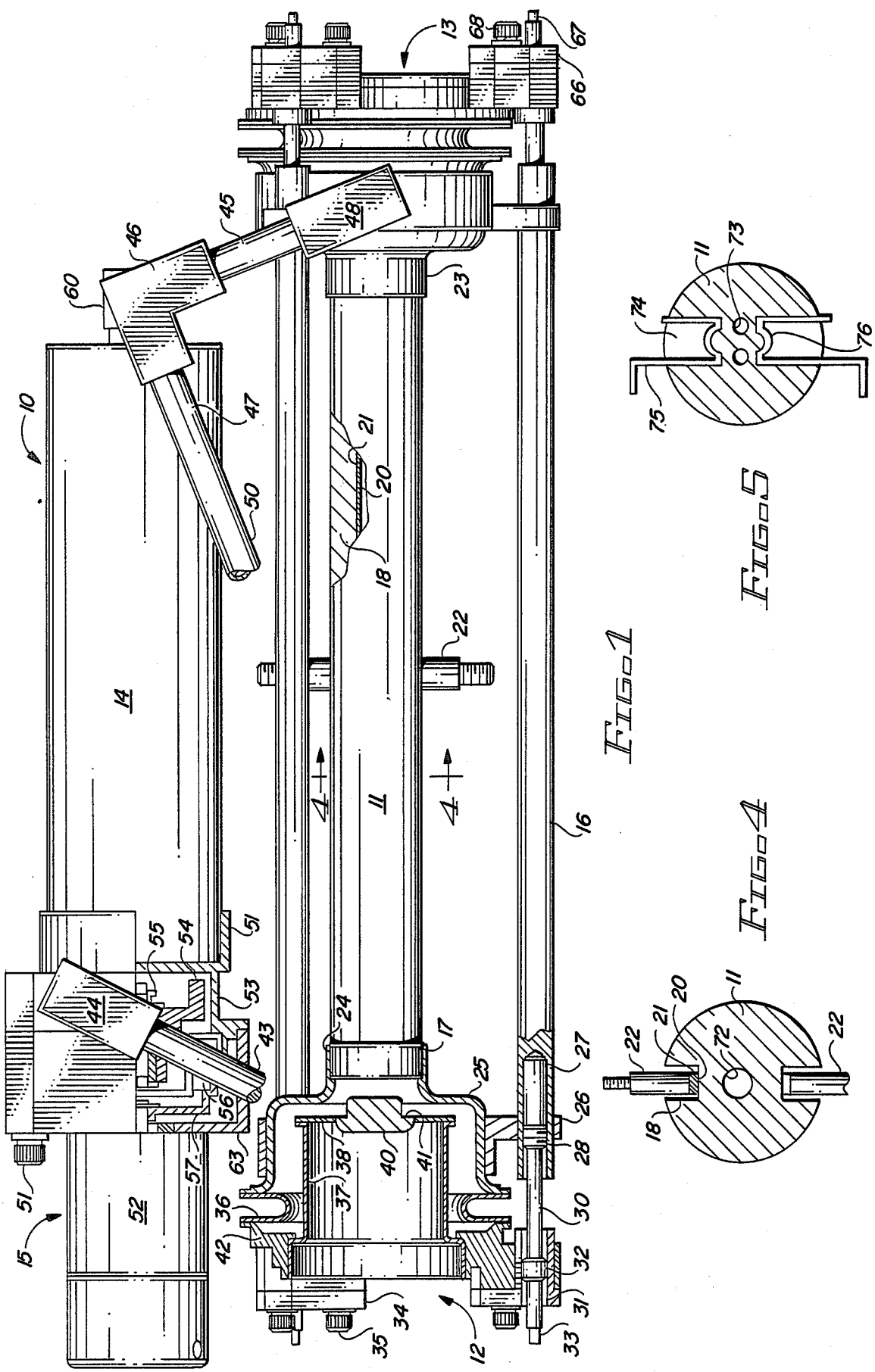

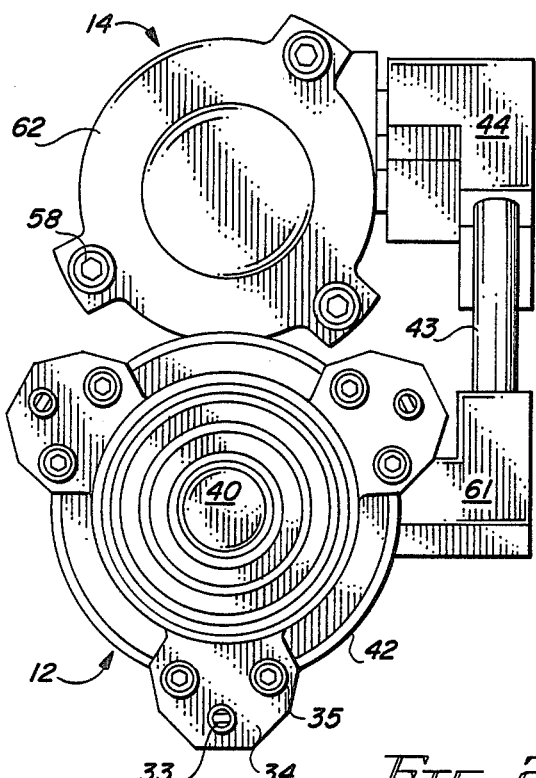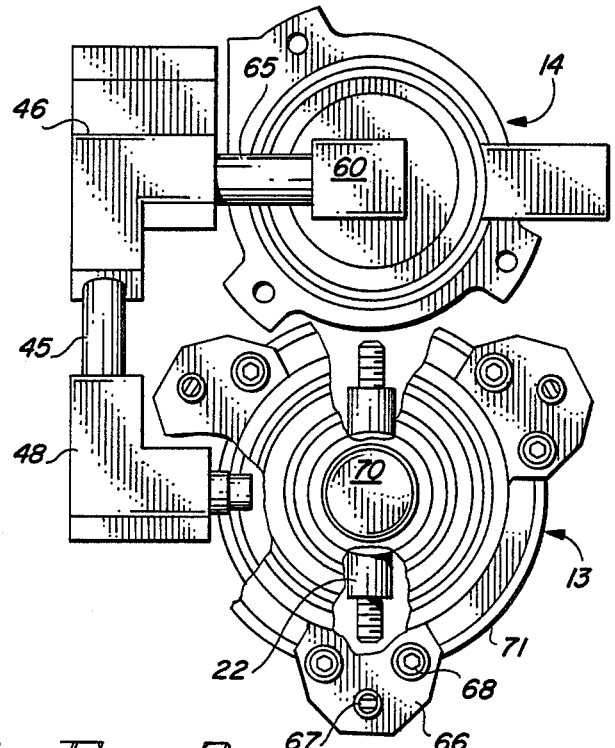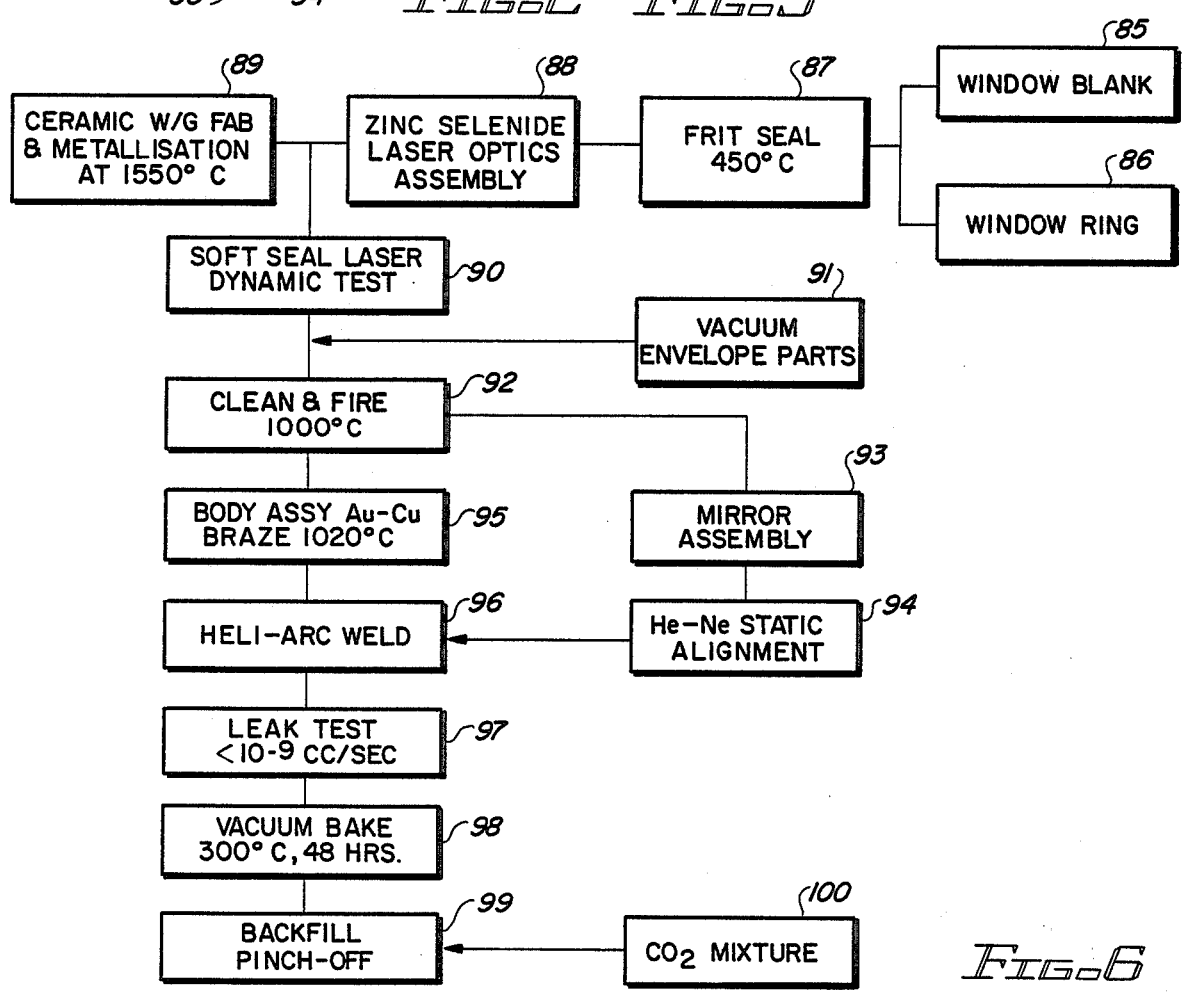

GAS LASER AND METHOD OF MAKING A GAS LASER

BACKGROUND OF THE INVENTION

The present invention relates to the laser apparatus and a method of making the laser apparatus and especially to a gas Waveguide laser apparatus having hard sealed optical to metal seals and temperature compensation.

In the past, a wide variety of gas lasers have been provided. Many of these are $CO_2$ Waveguide lasers which fall within the same classification as the present laser apparatus. Typically, a Waveguide laser has a wave guide which may be made of a ceramic material having a bore extending therethrough and filled with a gas such as $CO_2$. Electrodes are placed adjacent to a wave guide tube for pumping the gas located in the Waveguide tube. Each end of the tube generally has a mirror mounted thereto, one of them with substantially total reflection and the other mirror having a partial reflecting surface to allow the escape of laser energy.

The present invention is directed towards a wave guide laser as well as to a method of making a wave guide laser, utilizing a ceramic Waveguide but having a circulating gas ballast tank and electric pump to circulate the $CO_2$ gas from the ballast tank through the wave guide bore, and includes special optical assemblies and temperature compensating design, as well as a method of making a laser apparatus in accordance with the invention.

Prior art lasers can be seen in the Newman Waveguide Laser U.S. Pat. No. 4,381,564, having a capacitively of coupled discharge which includes a wave guide having a bore therethrough, along with a pair of high voltage electrodes driven by high voltage supply. An optical assembly is mounted to each end of the wave guide for mounting mirrors at each end of the bore of the Waveguide. A tube connects each end of the wave guide assembly to connect a gas reservoir and a circulator to allow the gas within the bore to be replenished and recirculated. The Noble et al., U.S. Pat. No. 4,065,370 is for the ion plating of a thin metallic strip to a flashlamp for triggering the flashlamp. Prior art seals or mounting for optics can be seen in the prior Holtz U.S. Pat. No. 3,599,112 and in the Knowles U.S. Pat. No. 3,978,425. In the Ljung et al. U.S. Pat. No. 4,153,317, an indium seal for gas lasers is illustrated. Indium is a common prior art technique for attaching laser optics to optical assemblies, while another common prior art uses an epoxy adhesive to attach the laser mirror to the laser assembly. The Ljung Patent also suggests the passive alignment of the optics prior to the mounting and the sealing of the optics by optical contact, epoxy, or glass frit, then evacuating and filling the laser. Fine alignment is accomplished in this laser by deforming the support of one or both mirrors by using a metal tube with a neck-down section using set screws to accomplish the adjustment. Other glass to metal seals can be seen in the Knowles U.S. Pat. No. 3,978,425 for laser components and fabrication methods. This patent has a metal casing in which the optical elements are attached to a kovar gridwork and has interconnected annular portions placed in a mold and optical glass pellets introduced onto each ring so that the application of heat melts the glass and forms the glass directly onto the kovar rings. Alignment of the optical elements is by displacing the metal casing slightly. In U.S. Pat. No. 4,393,506 to Laakmann at al., a method is disclosed for manufacturing a sealed-off RF excited $CO_2$ laser with a longer operating life. The present invention is also directed towards a wave guide laser which has a longer shelf and operating life. A number of factors have been identified as the principle causes of limiting the operating life of a sealed-off $CO_2$ laser. Sealed-off lasers are utilized because they do not require auxiliary gas cylinders and vacuum pumps and so that they can be more readily portable. However, one of the problems associated with sealed-off $CO_2$ lasers is that of maintaining stable long-term operation despite factors which tend to destabilize the gas chemistry, such as $CO_2$ disassociation.

There are a large number of prior art patents which deal with either temperature compensation for maintaining the alignment of the optics or with specific alignment techniques for the optics. Typical prior art patents of this nature can be seen in the Singleton U.S. Pat. No. 4,342,117; Marlett et al., U.S. Pat. No. 4,224,579; the Smars U.S. Pat. No. 3,671,883; Sepp et al., U.S. Pat. No. 4,457,001; the Hamerdinger et al., U.S. Pat. No. 4,149,779 and in the Barnaby U.S. Pat. No. 3,605,036. The Singleton Patent teaches a mirror mounting arrangement for a gas laser which connects the mirror optics to a flanged cup which is then connected to another flanged cup attached to the body using an annular spacer member between the flanged cups and a sealing technique that does not require epoxy resin or indium seals.

In contrast to the prior art, the present invention provides for a Waveguide assembly having a gas ballast tank and a permanent magnet circulating pump for circulating the $CO_2$ through a ceramic wave guide and has alignment rods selected and supporting the optical assemblies on each end of the Waveguide to match the temperature expansion of the wave guide while allowing the alignment of the optical mirrors. The optical mirrors are mounted to an expansion tube expanding in the opposite direction from the wave guide and alignment bars and is selected to negate the expansion of the Waveguide and alignment rods to maintain the laser mirrors in alignment. The method of making the laser allows for a window blank to be inserted into a window ring and attached with a glass frit seal at 400 degrees centigrade in nitrogen and to attach this to the optical assemblies. The optical assemblies can then be baked at a high temperature for long periods of time for removing moisture and impurities therefrom prior to filling with the $CO_2$ gas.

SUMMARY OF THE INVENTION

A $CO_2$ Waveguide laser apparatus is provided which uses a ceramic Waveguide made of alumina, having a bore extending therethrough and a pair of slots cut into the exterior thereof for forming the electrodes therein. An electrode is formed in each of the ceramic Waveguide slots and has an electrode post extending therefrom. An optical assembly for holding a mirror on each end of the Waveguide is attached to each end of the ceramic Waveguide with the mirror being attached to a metal ring in the optical assembly where they harden the fuse glass frit material. A plurality of invar metal rods are connected between the optical assemblies. The metal rods are connected to kovar rings on the mounting cup for the optical assemblies, and each has an adjustment screw exending from a second kovar ring into the metal rod with two threaded portions for adjusting part of the optical assembly relative to the metal rods for aligning the mirrors. Adjustment of the threaded rods bend an annular kovar flexure member connecting the Waveguide connecting cup to the rest of the optical asembly. The optical assembly includes a kovar metal cylinder for attaching the metal ring having the mirror mounted thereto. The invar support and alignment rods are matched to the expansion rate of the Waveguide which expands together in one direction with the increase in temperature in the asseembly. While the kovar cylinder holding the metal ring and mirror has an expansion rate opposite to and matching the expansion of the wave guide and rods for maintaining the alignment of the mirrors. A gas ballast tank connects gas to each end of the Waveguide and circulates to the $CO_2$ gas between the ballast tank and the Waveguide with a permanent magnet pump.

The process for making the laser includes the steps of selecting the optical window blank of zinc selenide, then making a metal window blank support ring of carpenter alloy having an opening therein and mounting the zinc selenide mirror blank therein, then applying a glass paste material between the mirror blank and the support ring and heating the ring mirror blank and glass paste to a temperture of 450 degrees in a nitrogen atmosphere to fuse the glass frit and seal the glass blank to the metal ring. The carpenter metal window blank support ring is then welded to a kovar expansion cylinder in the optical assembly. The laser Waveguide has a metallized end portion for attaching the optical assembly support cups thereto. The wave guide assembly has clean fired to 1,000 degrees centigrade for welding the system together and the body assembled by brazing to over 1,000 degrees centigrade, followed by the heli-arc welding of the optical assemblies to the Waveguide assembly. Leak tests are then performed and the entire laser assembly is vacuum baked at 300 degrees centigrade for forty-eight hours and is then back filled with $CO_2$ and pinched off with a pinch-off tube.

BRIEF DESCRIPTION OF THE DRAWINGS

Other objects, features and advantages of the present invention will be apparent from the written description and the drawings in which:

FIG. 1 is a cutaway side elevation of a gas laser in accordance with the present invention;

FIG. 2 is an end elevation of the laser in accordance with FIG. 1;

FIG. 3 is an end elevation of the laser in accordance with FIG. 1;

FIG. 4 is a sectional view taken on line 4—4 of FIG. 1;

FIG. 5 is a sectional view in accordance with FIG. 4 showing an alternate embodiment electrode post; and FIG. 6 is a flow diagram of the process of making the laser in accordance with FIGS. 1 through 5.

DESCRIPTION OF THE PREFERRED EMBODIMENTS

Referring to the drawings and especially to FIGS. 1 through 4, a $CO_2$ Waveguide laser 10 is illustrated having a ceramic Waveguide 11 which may be made of an alumina and may have a bore 73 extending therethrough as seen in FIG. 4. The Waveguide 11 has an optical assembly 12 attached to one end and optical assembly 13 attached to the other end thereof. A stainless steel gas ballast tank 14 is also attached to one side of the laser for holding extra $CO_2$ gas for the laser and is driven by a permanent magnet pump 15 to circulate the gas from the tank through the bore in the Waveguide 11. The optical assemblies 12 and 13 are supported by invar metal stabilizing rods 16 of which three are shown on the present laser. The optical assemblies 12 and 13 are connected to metallized surfaces 17 on each end of the wave guide 11 which may be a band of molybdebum and maganese with a nickel plate so that optical assembly support cups 23 of assembly 13 and 25 of assembly 12 can be brazed at 24 to the metallized band 17 at each end of the Waveguide 11. Cups can be brazed with a gold-copper alloy at 1,040 degrees centigrade. A slot 18 has been cut into the outside along most of the Waveguide 11 on two sides thereof and has had the bottom metallized 20 with a copper electrode 21 brazed thereto. An electrode post or connector 22 is attached to each of the elongated electrodes 21 for connecting a source of power such as a high voltage placed between the two electrodes 21. One electrode is an anode and the other a cathode and is used in pumping the laser gas. The metal supporting cups 25 are made of kovar, an alloy of nickel and iron, and have a kovar ring 26 extending therearound for attaching the rods 16 thereto on each end for stabilizing the optical assemblies between each other. Each rod 16 has each end thereof, having a threaded bore 27 extending thereinto for an external threaded adjustment portion 28 to be threaded into and attached to the adjustment rod 30 which in turn has another externally threaded portion 32 riding in a threaded bore 31 through bar support plates 34. A differential screw head 33 is rotated to rotate the externally threaded members 32 and 28 in their threaded bores to make adjustments in the laser assembly. Plates 34 are held with screws 35 to the annular kovar member 42, which in turn, is welded to an expansion kovar flange 37. An annular bellows flexure member 36 is also made of kovar and connects the plate 25 to the annular kovar ring 42, while the kovar ring 42 is connected to the expansion kovar sleeve 37. A carpenters metal plate 38 has the glass blank with a mirrored surface 40 attached thereto. Carpenters metal is an alloy of nickel and iron and is selected for its expansion rate in accordance with the zinc selanide window blank 40. The glass blank 40 attached to the carpenter metal mirror support ring 38 using a silica sealed glass paste at their abutting surfaces 41 which is fused into a glass frit material having an expansion to match the zinc selenide glass 40. The three elements are heated to 440 degrees centigrade in a nitrogen atmosphere to attach the mirror optics 40 to the metal mirror support plate 38. The metal mirror support plate is then welded to the kovar sleeve 37 to completely seal the $CO_2$ gas within the Waveguide bore and end optics and is connected through copper tubing to the ballast tank 14.

In operation, rotating the differential screw head 33 rotates the threaded portions 32 and 28 to rotate the plates 34 along with the kovar ring 42 having the expansion tube 37 attached thereto while bending the metal flexure rings 36 to thereby adjust the position of the mirror 40. Adjusting the three different differential screws 33, spaced equally apart, will adjust the mirror 40 to any position desired to provide the maximum output from the laser. The optical assembly is connected at one end through a copper tube 43 and an L-connector 61 connected to the optical assembly 12 and through another L-connector 44 connected to the ballast tank 14, so that the flow of $CO_2$ gas can go between the optical assembly 12 and the ballast tank 14. A similar copper tube 45 has a T-connector 46 on one side and is connected to copper tube 65 connected to another connector 60 which is connected to one end of the ballast tank 14. The T-connector has a pinch-off tube 47 which is used for evacuating and filling the laser and ballast tank 14 and which can be pinched off at 50. The copper tube 45 is connected through the L-connector 48 to the optical assembly 13. The $CO_2$ gas ballast tank 14 is connected to the pump 15 through a housing portion 51 and may be welded thereto and has an electric motor 52 for operating the pump 15. The electric motor 52 is attached to the housing 63 of the pump. The pump includes an impeller 54 along with a spacer 55 formed in the housing 51 and has a magnet 56 connected to a retainer 57 rotated by the motor 52. The motor 52 in turn rotates the magnet on the outside through a non-magnetic housing portion to drive an gold-plated iron impeller 54. This type of pump avoids any shaft seals and allows a complete sealed housing between the pump motor 52 and the driving impeller 54 located inside a separate housing connected to a ballast tank 14 for circulating the gas between the tank 14 and the laser wave guide 11. Threaded fasteners 58 allows the motor and pump to be attached together through the support housing portion 62.

The optical assembly 13 can be seen as having the same elements as the optical assembly 12 including support plates 66 having the differential screw head 67 protruding therethrough and extending into the invar rods 16 at the opposite end of the invar rods 16 and a threaded fastener 68 for attaching the plates to the kovar rings in the same manner as already explained for the optical assembly 12. The optical assembly 13 supports and optical mirror 70 in the same manner as that of assembly 12 which may be a zinc selenide window. One of the optical assemblies has a one hundred percent mirror coat while the other has a ninety-five percent partial coating thereon to allow the escape of energy at one end while allowing the continuous reflection from both ends.

It should be noted that the invar rods 16 has been chosen to have very small amount of expansion due to the increase of temperature as the laser heats up, At the same time, the kovar expansion sleeve 37 has been chosen to have a size and a material that expands at almost the identical rate for its temperature increase as the expansion of the invar stabilizing rod 16 but in the opposite direction, so that while the ceramic wave guide 11 and invar stabilizing rod 16 are expanding in one direction due to the increase of temperature from the laser action, the cylinder 37 is expanding at almost the same rate in the opposite direction to thereby maintain the mirrors 40 and 70 in substantial identical alignment during the heat expansion of the laser, in accordance with the initial alignment of the laser which has been made through the differential screws 33, bending the flexure plate 36.

The expansion is in accordance with the following thermal expansion compensation chart.

| THERMAL EXPANSION COMPENSATION | |
|---|---|
| a (INVAR) = | $0.9 \times 10^{-6}$/F |
| a (KOVAR) = | $3.5 \times 10^{-6}$/F |
| a (ALUMINA) = | $3.5 \times 10^{-6}$/F |
| FOR T = | +50 F |
| L (CERAMIC W/G) = | 0.0018 INS. |
| $L_1$ (INVAR ROD) = | +0.0003 INS. |
| $L_2$ (2-KOVAR CUPS) = | 0.00029 INS. |
| NET SEPN. OF MIRRORS = | 0.00001 INS. |

In addition, the thermal expansion of the zinc selenide window mirror blank 40 has been chosen to match the carpenter metal mirror supporting disk 38 and the glass frit sealing area 41 has been chosen to be of a similar expansion rate so as to prevent the mirror 40 and 70 from breaking loose from the seal due to the expansion and contraction when the laser heats up and cools down. The zinc selenide window blank is mounted to a carpenter "52" alloy window ring using Thick Film Systems, Inc., 1162 silica seal glass paste which is fused into a glass frit seal. The seal is made by heating the combination to 440 degrees centigrade in a nitrogen atmosphere which eliminates the need for relapping the optical blank 40 when the heating is done in an air furnace. The oxidizing environment requires that the zinc selenide be relapped prior to having a mirrored coating applied thereto.

Turning to FIG. 5, an alternate embodiment of a Waveguide laser in accordance with FIG. 1 through 4 is illustrated in a sectional view similar to that shown in FIG. 4 except that special electrode post utilizes a different design from those shown in FIGS. 1 through 4. The ceramic Waveguide 11 has a pair of elongated slots 74 cut in each side thereof, on each side of a pair of Waveguide bores 73. The bottom of the slots 74 have been metallized as before, but a special post clip 75 has been shaped with a center arcuate portion 76 and shaped to follow the sides of the Waveguide slots 74. The electrode 75 can be snapped into places in the slots 74 and welded or brazed as in the prior embodiment to the metallized surface.

Turning to FIG. 6, a flow diagram of the process of manufacturing a laser in accordance with FIGS. 1 through 5 is illustrated. A window blank 85 is selected of a zinc selenide for forming the laser mirror at each end of the laser. A window ring is made of carpenter metal having an opening therein in the step 86 and the window blank 85 is placed therein with a glass paste therebetween to form a glass frit seal when the window blank and window ring are heated with the glass paste to 450 degrees centigrade at step 87. The attached window blank and window ring forming the zinc selanide, laser optics are then assembled to the optical assemble for each end of the laser. A ceramic Waveguide is fabricated of alumina with metallization of the ends at 1650 degrees centigrade in step 89 and is attached to the laser optic assembly and a soft seal laser dynamic test is performed in step 90. The vacuum envelope parts 91 can be attached to the laser assembly which can be cleaned and fired at 1,000 degrees centigrade in step 92 with the mirror assembly 93 removed and put through helium nitrogen static alignment. Step 94: The laser assembly can then have the body assembled with a gold/copper braze at 1,020 degrees centigrade at step 95 and the laser assembly heli-arc welded to the end of the Waveguide in step 96. This provides for the kovar attachment cup of the laser optic assembly to be attached to the metallized Waveguide ends. A leak test is then performed in step 97 having a ten to the minus 9 CC per second test. The laser assembly is then vacuumed baked at 300 degrees centigrade for fourty-eight hours at step 98. This can be accomplished with the present laser because of the first seals in step 87 which can withstand temperatures up to 450 degrees without melting or otherwise leaking. This allows water and any impurities in the laser system to be cleaned out thereof so that the laser can be filled with a $CO_2$ gas mixture 100 through the back filled pinch-off tube in step 99 and then the pinch-off tube pinched off. The window blank is selected of a zinc selenide mirror which has a glass frit seal of similar expansion attached to a carpenter alloy 52 disk which also has a similar expansion rate to the zinc selenide mirrors. These are, in turn, welded to the kovar tube 37. A closed loop circulation of the $CO_2$ gas mixture is provided by magnetically coupled pump attached to the gas ballast tank which in turn is connected by copper tubing and connectors to the wave guide optical assemblies. An aluminum heat sink is attached to the ultimate laser but is not illustrated. High voltage power supply is connected to the electrodes 21 through the anode and cathode posts 22.

It should be clear at this point that both a $CO_2$ wave guide laser apparatus has been illustrated along with the method of manufacturing a wave guide laser apparatus. The laser includes all hard seal construction with a glass frit connection of the glass and gold braze alloy connection between the metal components to provide a laser which can have high temperature processing at 400 degree centigrade to drive out water and contaminates. But also, to provide for a laser with a long shelf life and long operating life. Gas circulation is within a sealed envelope using a magnetic pump to stabilize the laser output. Invar stabilizing rods are utilized to match the expansion of the alumina ceramic Waveguide to reduce the temperature expansion but the laser uses an opposite expanding kovar expansion sleeve connected to the optics. A high precision mirror adjustment is also provided with a flexure (bellows like) kovar member driven by threaded members driving the invar stabilizing rods to shift the optics. The use of all hard seals with no elastomer or epoxy seals allows for the high temperature processing also helps to provide for the ten year shelf life. The electrodes are external to the Waveguide bore and are placed in slots so that they are sturdy and avoid any sputtering in the laser.

However, the present invention is not to be considered limited to the forms shown which are to be considered illustrative rather than restrictive.

I claim:

1. A gas laser apparatus comprising in combination:
   a ceramic waveguide means having a bore extending therethrough and a pair of slots cut into the exterior of said bore for forming electrodes therein;
   an electrode formed in each of said ceramic wave guide slots and having electrode costs extending from said electrodes;
   an optical assembly having a mirror located on each end of said ceramic waveguide to each of said mirrors being attached to a metal ring in said optical assembly with a hardened fused glass frit material, said optical assembly metal ring is attached to a metal sleeve having a temperature expansion rate matched to the temperature expansion rate of a plurality of metal rods and said ceramic waveguide to expand said metal sleeve in a direction opposite from the expansion of said metal rods and ceramic waveguide; a gas ballast tank attached adjacent said ceramic waveguide, said gas ballast tank having a permanent magnet pump attached thereto for pumping the gas from said ballast tank through said ceramic waveguide, said magnetic pump having a permanent magnet coupling between an electric motor through a pump housing wall to permanent magnets attached to rotating vanes; and
   said plurality of metal rods connected between said optical assemblies, each of said plurality of metal rods having an adjustment screw on each end thereof movably connecting said optical assemblies to said rods for aligning the mirror of each optical assembly; whereby a laser has an adjustable mirror attached thereto with a high temperature glass frit seal.

2. A gas laser apparatus in accordance with claim 1 in which a gas ballast tank is attached adjacent to the ceramic waveguide and is connected thereto at each end through a pair of connecting tubes.

3. A gas laser apparatus in accordance with claim 2 in which said ceramic waveguide has metallized ends thereon and said optical assemblies are welded thereto.

4. A gas laser apparatus in accordance with claim 3 in which said metal rods are invar and said ceramic waveguide is made of alumina.

5. A gas laser apparatus in accordance with claim 1 in which said optical assembly on each end of said ceramic waveguide includes a metal cup welded to said ceramic waveguide.

6. A gas laser apparatus in accordance with claim 5 in which said metal cup is connected to a metal element bendable for optical alignment of said metal sleeve and mirror, said flexure element being bendable by said metal rod adjustment screws being threaded in or out of said metal rod and optical assembly.

7. A gas laser apparatus in accordance with claim 6 in which an annular support is attached to said optical assembly metal flexure element on one side and is connected to said metal sleeve along the inner periphery thereto and is coupled through brackets to said plurality of metal rods through said adjustment screws on each end thereof, whereby operation of adjustment screws move the metal ring to bend the flexure elements and optical assembly sleeve, metal ring and mirror.

8. A gas laser apparatus in accordance with claim 7 in which said optical assembly metal cup is made of kovar and said flexure element is made of kovar.

9. A gas laser apparatus in accordance with claim 8 in which said optical assembly flexure element is an annular grooved kovar member welded to said optical assembly metal cup and to said annular support ring.

10. A gas laser apparatus in accordance with claim 9 in which said optical assembly metal ring is made of carpenter's metal.

11. A gas laser apparatus in accordance with claim 10 in which said plurality of metal rods, adjustment screws are threaded in said rods and are threaded in said brackets attached to said annular support ring.

12. A gas laser apparatus in accordance with claim 1 in which said electrode formed in each ceramic waveguide slot, electrode post is a post bracket having a generally U-shaped with one arm extending above said waveguide slot and having a 90 degree bend therein.

13. A gas laser apparatus in accordance with claim 12 in which said electrode post has an annular bottom portion on said U-shaped electrode.

14. A gas laser apparatus in accordance with claim 13 in which said ceramic waveguide assembly has a pair of bores extending therethrough with a portion of said U-shaped electrode post extending to a predetermined distance from each bore therethrough.

* * * * *